(12) United States Patent
Thakur

(10) Patent No.: US 9,813,987 B2
(45) Date of Patent: Nov. 7, 2017

(54) SYSTEM AND METHOD FOR INTELLIGENT POWER SAVE NOTIFICATION

(75) Inventor: Sidharth Thakur, San Jose, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 1046 days.

(21) Appl. No.: 13/491,317

(22) Filed: Jun. 7, 2012

(65) Prior Publication Data

US 2013/0329614 A1    Dec. 12, 2013

(51) Int. Cl.
*H04W 52/02* (2009.01)

(52) U.S. Cl.
CPC ......... *H04W 52/0216* (2013.01); *Y02B 60/50* (2013.01)

(58) Field of Classification Search
None
See application file for complete search history.

(56) References Cited

U.S. PATENT DOCUMENTS

| | | |
|---|---|---|
| 7,194,261 B2 | 3/2007 | Emeott et al. |
| 7,590,079 B2 | 9/2009 | Smavatkul et al. |
| 7,907,557 B2 | 3/2011 | Carter |
| 8,370,441 B2 | 2/2013 | Ananthanarayanan et al. |
| 2005/0025081 A1* | 2/2005 | Wakamatsu ......... H04B 1/1615 370/311 |
| 2005/0136913 A1* | 6/2005 | Kampen et al. ........... 455/426.2 |
| 2007/0238437 A1 | 10/2007 | Jaakkola |
| 2009/0097428 A1 | 4/2009 | Kneckt et al. |
| 2010/0111066 A1 | 5/2010 | Mehta |
| 2011/0002253 A1 | 1/2011 | Cha et al. |
| 2011/0268051 A1* | 11/2011 | Tsao ..................... H04W 4/008 370/329 |
| 2012/0207071 A1* | 8/2012 | Zhu ..................... H04B 7/0452 370/311 |
| 2012/0263086 A1* | 10/2012 | Liu et al. ..................... 370/311 |

FOREIGN PATENT DOCUMENTS

| | | |
|---|---|---|
| EP | 1450240 A2 | 8/2004 |
| EP | 1954078 A1 | 8/2008 |
| EP | 2178242 A1 | 4/2010 |
| EP | 2323448 A1 | 5/2011 |
| JP | 2004234667 A | 8/2004 |
| JP | 2005033586 A | 2/2005 |
| JP | 2007019607 A | 1/2007 |
| WO | WO-2008039970 A1 | 4/2008 |

OTHER PUBLICATIONS

International Search Report and Written Opinion—PCT/US2013/044132—ISA/EPO—Aug. 27, 2013.

* cited by examiner

*Primary Examiner* — Jason Mattis
*Assistant Examiner* — Hong Shao
(74) *Attorney, Agent, or Firm* — Paradice and Li LLP

(57) ABSTRACT

Systems and methods are disclosed to coordinate a power save delay between a station (STA) and an access point (AP.) The STA may be configured to transmit information regarding a power save delay duration to the AP. The STA may then inform the AP that it will be entering power save mode and delay entering the power save mode for a specified period of time corresponding to the power save delay duration, thus providing a buffer period to allow the AP to complete the delivery of any frames that may already be in the hardware queue.

16 Claims, 2 Drawing Sheets

SYSTEM AND METHOD FOR INTELLIGENT POWER SAVE NOTIFICATION

FIELD OF THE PRESENT INVENTION

This disclosure generally relates to wireless communication systems and more specifically to systems and methods for facilitating operation of a device in power save mode.

BACKGROUND OF THE INVENTION

Wireless networks are increasingly employed to provide various communication functions including voice, video, packet data, messaging and the like. A wireless network such as a wireless local area networks (WLAN) may include any number of access points (APs) and any number of stations (STAs). An access point may act as a coordinator for communication with the stations. A station may actively communicate with an access point, may be idle, or may be powered down at any given moment depending on the data requirements of the station. Particularly with regard to mobile devices and other devices that are battery powered, minimizing energy consumption is an important aspect in the design of such systems. To that end, wireless communication systems typically include various power saving techniques that generally seek to increase the amount of time spent in a power save mode.

For example, within the IEEE 802.11 standards established by The Institute of Electrical and Electronics Engineers are provisions to allow a station to enter a low power mode of operation, also known as sleep mode, to save power. A STA may asynchronously signal that it is entering a power save mode through the use of a power management message contained in a packet sent to the AP. Upon receipt of a power management message indicating the STA is in power save mode, the AP may buffer packets to be sent to the STA. The AP periodically transmits beacons with a traffic indication message that may be used to indicate that data is ready to be transmitted to the STA. The period of time between beacon transmissions may be termed the beacon interval. The STA generally utilizes a period of time called the listen interval, corresponding to a plurality of beacon intervals, to coordinate its power save with the AP. The AP buffers data for the STA during the listen interval and the STA may awaken from power save mode to receive the beacon at the end of each listen interval. If the beacon indicates data is pending, the STA will initiate transfer of that data. Conversely, if no data is ready to be transmitted, the STA may return to power save mode.

As will be appreciated, proper coordination should be maintained between the AP and the STA to ensure that data is sent during periods when the STA is awake and able to actively receive the information, otherwise the information may need to be resent, consuming additional network resources, or worse, may be lost. In particular, an aspect of the above power save technique is that the power management bit is processed at the media access control (MAC) layer of the AP. There is a latency associated with operations occurring at the MAC layer, particularly as compared to operations occurring at lower levels, such as the hardware physical (PHY) layer. As a result, the PHY layer may have frames already queued for delivery to the STA when the MAC layer processes the power management bit. In turn, the one or more frames queued for delivery in the hardware may be transmitted to the STA. However, since the STA may go to sleep as soon as it sends the frame with the power management bit set, the STA may not receive the one or more frames subsequently sent from the hardware queue. Typically, the AP may retry transmitting the frames multiple times, consuming bandwidth. Ultimately, the frames may be dropped, further degrading performance.

Therefore, there remains a need to provide systems and methods for improving coordination of the operation of a device in power save mode to facilitate transfer of information. This invention accomplishes these and other goals.

SUMMARY OF THE INVENTION

In accordance with the above needs and those that will be mentioned and will become apparent below, this specification discloses a wireless communication system including a station, wherein the station is configured to enter a power save mode after a specified power save delay duration following a transmission to an access point of a power management frame containing a power management indication. Preferably, the station is configured to transmit a frame to the access point having information corresponding to the power save delay duration.

In one aspect, the system also includes an access point configured to determine if a period of time corresponding to the power save delay duration has elapsed since transmission of the power management frame after receipt of the power management frame from the station and prior to transmitting a frame to the station, such that the access point transmits a delivery frame addressed to the station if the period of time has not elapsed. The access point may have a hardware queue configured to receive frames to be transmitted such that the access point transmits the delivery frame by sending the delivery frame to the hardware queue.

In another aspect, the access point may be configured to hold the delivery frame when the period of time has elapsed, for example, in a software buffer.

In yet another aspect, the access point may be configured to transmit a frame to the station having information corresponding to the power save delay duration. In one embodiment, the information corresponding to the power save delay duration is determined dynamically. In another embodiment, the station is configured to determine the power save delay duration from the information corresponding to the power save delay duration transmitted by the access point.

A further aspect of the disclosure is directed to embodiments in which the power save delay duration is in the range of approximately 32 to 64 time slots.

This disclosure is also directed to a method of wireless communications between an access point and a station including the steps of transmitting a power management frame from the station to the access point containing a power management indication and placing the station in a power save mode after a specified power save delay duration. The method may also include transmitting a frame from the station to the access point having information corresponding to the power save delay duration prior to transmitting the power management frame.

In another aspect, the method may include receiving the power management frame from the station with the access point, determining if a period of time corresponding to the power save delay duration has elapsed since transmission of the power management frame, and transmitting a delivery frame addressed to the station with the access point if the period of time has not elapsed. In one embodiment, the method may include transmitting the delivery frame by sending the delivery frame to a hardware queue of the access point. In another embodiment, the method may include holding the delivery frame at the access point when the period of time has elapsed, for example in a software buffer.

The method may also include transmitting a frame to the station from the access point having information corresponding to the power save delay duration. In one embodiment, the information corresponding to the power save delay duration may be determined dynamically. In another embodiment, the power save delay duration is determined at the station from the information corresponding to the power save delay duration transmitted by the access point.

BRIEF DESCRIPTION OF THE DRAWINGS

Further features and advantages will become apparent from the following and more particular description of the preferred embodiments of the invention, as illustrated in the accompanying drawings, and in which like referenced characters generally refer to the same parts or elements throughout the views, and in which.

DETAILED DESCRIPTION OF THE INVENTION

Figure 1:
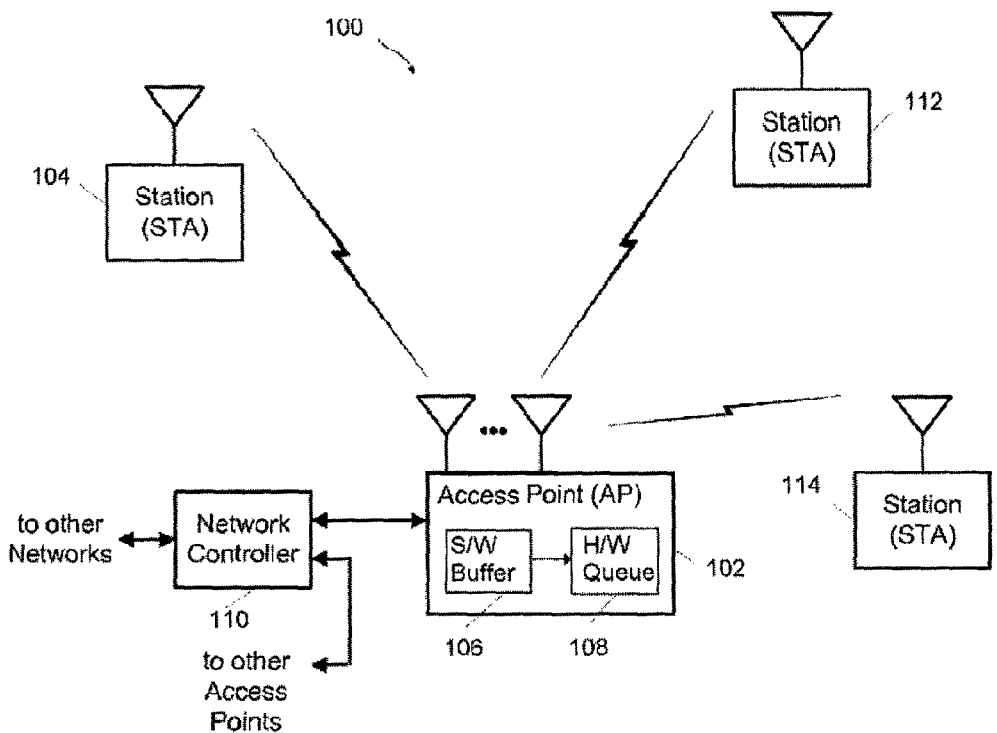
FIG. 1 depicts a wireless communication system, according to one embodiment of the invention.

At the outset, it is to be understood that this disclosure is not limited to particularly exemplified materials, architectures, routines, methods or structures as such may, of course, vary. Thus, although a number of such options, similar or equivalent to those described herein, can be used in the practice or embodiments of this disclosure, the preferred materials and methods are described herein.

It is also to be understood that the terminology used herein is for the purpose of describing particular embodiments of this disclosure only and is not intended to be limiting.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of computer-executable instructions residing on some form of computer-usable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

By way of example, and not limitation, computer-usable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), and flash memory or any other medium that can be used to store the desired information.

Further, embodiments are discussed in specific reference to wireless networks. As such, this disclosure is applicable to any suitable wireless communication systems having the necessary characteristics. Although discussed in specific reference to a WLAN featuring an AP and an associated STA, the techniques of this disclosure may be applied to other wireless communication systems or to other network configurations, including ad hoc and STA-to-STA networks, involving a transmitter device and a receiver device. Accordingly, as used herein, the term "station" may mean any node in a wireless communications network having a role equivalent to a conventional station in an 802.11 infrastructure network and likewise, the term "access point" may mean any node having a role equivalent to a conventional access point.

In the figures, a single block may be described as performing a function or functions; however, in actual practice, the function or functions performed by that block may be performed in a single component or across multiple components, and/or may be performed using hardware, using software, or using a combination of hardware and software. Also, the exemplary wireless network devices may include components other than those shown, including well-known components such as a processor, memory and the like.

The techniques described herein may be implemented in hardware, software, firmware, or any combination thereof. Any features described as modules or components may also be implemented together in an integrated logic device or separately as discrete but interoperable logic devices. If implemented in software, the techniques may be realized at least in part by a tangible computer-readable storage medium comprising instructions that, when executed, performs one or more of the methods described above. The tangible computer-readable data storage medium may form part of a computer program product, which may include packaging materials.

The tangible computer-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements.

For purposes of convenience and clarity only, directional terms, such as top, bottom, left, right, up, down, over, above, below, beneath, rear, back, and front, may be used with respect to the accompanying drawings or particular embodiments. These and similar directional terms should not be construed to limit the scope of the invention in any manner and may change depending upon context. Further, sequential terms such as first and second may be used to distinguish similar elements, but may be used in other orders or may change also depending upon context.

Unless defined otherwise, all technical and scientific terms used herein have the same meaning as commonly understood by one having ordinary skill in the art to which the disclosure pertains.

Further, all publications, patents and patent applications cited herein, whether supra or infra, are hereby incorporated by reference in their entirety.

Finally, as used in this specification and the appended claims, the singular forms "a," "an" and "the" include plural referents unless the content clearly dictates otherwise.

As will be discussed in detail below, the techniques of this disclosure are directed to minimizing the potential for frames to be transmitted to a station in power save mode. To that end, the systems and methods of the invention coordinate a power save delay between the STA and the AP. The STA may be configured to transmit information regarding a power save delay duration to the AP. Preferably, the STA establishes the power save delay duration based upon a recommended interval communicated by the AP during the association process. The STA may then inform the AP that it will be entering power save mode by sending a frame with the power management bit set. However, the STA will delay entering the power save mode for a period of time corresponding to the power save delay duration, thus providing a buffer period to allow the AP to complete the delivery of any frames that may already be in the hardware queue.

These systems and methods are described in reference to an exemplary wireless communication system, WLAN 100, as shown in FIG. 1, which fundamentally includes at least two nodes, AP 102 and associated STA 104. As will be discussed below, AP 102 and STA 104 are configured so that STA 104 communicates a change in its power save mode, either from active to power save or from power save to active, through for example, a bit in the header of a frame sent by STA 104 to AP 102. Upon receipt of a frame having a power management bit indicating STA 104 is in power save mode, a "power management frame," AP 102 is preferably configured to buffer any frames addressed to STA 104 for a period of time, such as the listen interval. Likewise, STA 104 is preferably configured to exit power save mode at each listen interval to receive a beacon transmission from AP 102. If the beacon contains a message indicating that there is buffered data pending at AP 102 for STA 104, the station may send a power save poll (PS-Poll) message to AP 102. Upon receipt of the PS-Poll message, AP 102 may respond by transmitting the buffered data.

Generally, the processing of frames addressed to STA 104 by AP 102 involves a plurality of memory elements used for queuing or buffering the frames as they are parsed, categorized and otherwise manipulated while being routed to their destination. For example, software (S/W) buffer 106 may be configured to hold and manipulate frames in a relatively flexible manner in order to provide functionality associated with scheduling, allocation of network resources, delivery of frames at a specified quality of service (QoS) through prioritization, power management techniques as discussed above, and others. Although described as being a software buffer, S/W buffer 106 may implemented using any combination of software and hardware as desired, but in general may be associated with an upper level of the abstraction layers defined by the Open Systems Interconnection (OSI) model, such as the network layer or the transport layer.

Once a frame from S/W buffer 106 is identified as being ready for transmission, it may be sent to hardware (H/W) queue 108 based upon available space. Without limitation, H/W queue 108 may be configured to provide a low-latency handling to format the received frames in a manner compliant with the relevant IEEE 802.11 protocol and perform the modulation, conversion and transmission of the frames as a radio frequency signal. In some embodiments, the frame may be transferred to H/W queue 108 using an asynchronous operation, such as a direct memory access (DMA). As known to those of skill in the art, the manipulation of frames in H/W queue 108 may have relatively less flexibility regarding scheduling, for example by utilizing a first-in, first-out (FIFO) or similar scheduling mechanism. Although described as being a hardware queue, H/W queue 108 may implemented using any combination of software and hardware as desired, but in general may be associated with a lower layer of the OSI model, such as the physical layer or the data link layer.

It should be also recognized that although S/W buffer 106 and H/W queue 108 are represented as singular elements, they may also be implemented using multiple elements, for example by having dedicated software buffers for each defined class of service or by having a hardware queue for each transmit chain in a multiple input, multiple output (MIMO) system.

As indicated in the discussion above, once a frame is sent from S/W buffer 106 to H/W queue 108, it becomes very difficult or impossible to prevent H/W queue 108 from processing the frame and transmitting the frame. Although H/W queue 108 may be configured to exhibit low-latency, there is still a processing time associated with the handling of each frame that is dependent upon the speed of the hardware, the size of the queue and other relevant factors. Thus, if STA 104 has transitioned to a power save mode after the frame has been delivered to H/W queue 108 but before it is actually transmitted as a radio frequency signal, H/W queue 108 may still transmit the frame. Since STA 104 may now be in power save mode, the frame may not be received. Accordingly, when transmitted frames are not acknowledged as being received by STA 104, AP 102 may retry transmitting the frames multiple times which represents an inefficient use of the limited bandwidth. If STA 104 remains in a power save mode for a sufficient period of time, AP 102 may drop the frames which has further deleterious effects on the overall performance of wireless communication system 100. By employing the power save delay techniques of this invention, these negative impacts may be minimized or avoided.

FIG. 1 further shows AP 102 connected to network controller 110, such as in a centralized network architecture, as one non-limiting example of a suitable network architecture. Network controller 110 may be coupled to any number of access points, even though only one AP is shown, and provides coordination and control for these access points. Network controller 110 may be a single network entity or a collection of network entities and preferably provides a link to a wide area network (WAN), such as the Internet. For a distributed network, the access points may communicate with one another as needed without the use of network controller 110. AP 102 may also service additional stations, STA 112 and 114, that may be configured to utilize the power save delay techniques of this disclosure or may utilize conventional power save mode techniques.

As noted, AP 102 periodically transmits a beacon frame on the downlink carrying a preamble and an access point identifier (AP ID) that allows the stations to detect and identify the access point. The time interval between the start of two consecutive beacons is called a target beacon transmit time (TBTT) or a beacon interval. The beacon interval may be fixed or variable and may be set to a suitable duration, e.g., 100 msec. The beacon frame is used by APs to advertise network identification for the stations associated with the AP, the basic service set (BSS) and the related connection capabilities. The beacon frame also includes the traffic indication map (TIM) and delivery traffic indication map (DTIM) information elements used to advertise the existence of buffered data to associated stations that have been in power save mode, such as STA 104. Because the beacon frame includes required fields as well as optional vendor-oriented information elements, the size of the frame varies.

A station typically performs association procedures to associate with an access point when the station is first powered up or moves into a new WLAN coverage area. Association refers to the mapping of a station to an access point, which enables the station to receive distribution service. The association allows the distribution service to know which access point to contact for the station. The station attempts to disassociate whenever it leaves the network. The station performs reassociation procedures to "move" a current association from one access point to another access point within an extended service set (ESS). The association, disassociation, and reassociation procedures may be governed by the relevant wireless standard, such as the IEEE 802.11 standards.

Figure 2:
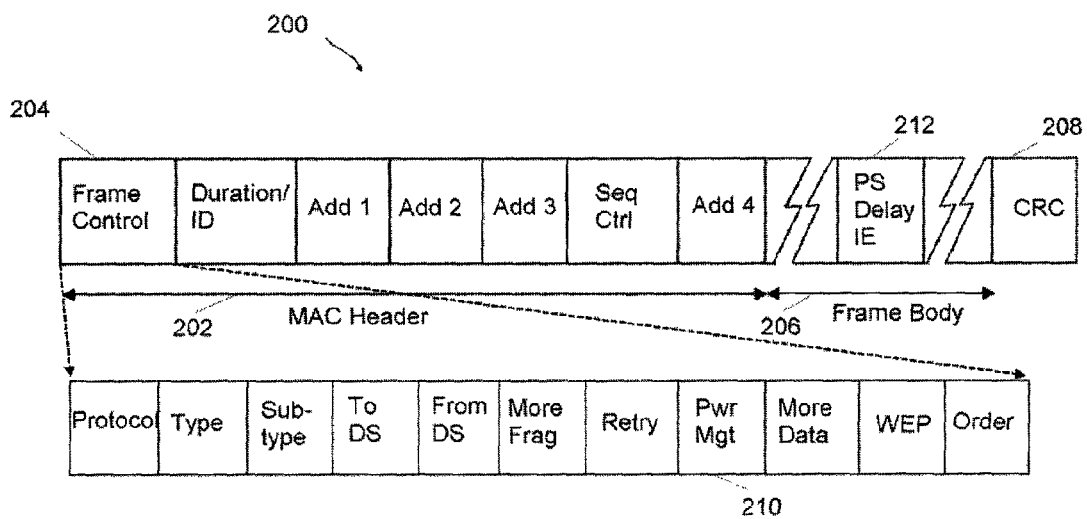
FIG. 2 depicts a generalized format of a transmission frame, according to one embodiment of the invention.

As will be appreciated, the exchange of information between STA 104 and AP 102 generally involves the use of management frames, control frames and data frames, each having specific parameters. An example of a generalized frame 200 having a format corresponding to IEEE 802.11 standards is depicted in FIG. 2. As shown, frame 200 includes a MAC header 202 of 18 bytes, containing the frame control 204, duration/ID, address and sequence control fields, a variable length frame body 206 and cyclic redundancy check (CRC) field 208 that provides a frame check sequence (FCS) function. Additional fields, such as a high throughput (HT) field (not shown) may be present depending upon the specific standard being employed.

The frame control 204 segment of MAC header 202 is shown in greater detail by FIG. 2, and includes fields providing various types of control information, including an identification of the 802.11 protocol of the frame, the type and subtype of the frame, distribution system information, information regarding additional information to be transmitted, security and order information. Frame control 204 also includes the power management field 210, which may comprise a single bit. Generally, STA 104 may send a management or data frame having the power management bit set to 1 to indicate that it is entering a power save mode and may send a frame having the power management bit set to 0 to indicate that it is entering active mode. FIG. 2 also shows that frame body 206 preferably contains power save delay (PSD) information element (IE) 212. As will be described below, the value of PSD IE 212 may be used by STA 104 to communicate to AP 102 a period of time that STA 104 will delay entering power save mode after sending a frame with the power management bit set. In a further aspect, PSD IE 212 or another suitable information element may be used by AP 102 to communicate a recommended power save delay duration to STA 104, which may confirm adoption of the recommended delay or may substitute another value as desired by sending the appropriate value in PSD IE 212. As will be appreciated, frame body 206 may include a plurality of proprietary information elements that may be vendor-defined, any of which may be employed as PSD IE 212. Alternatively, a new PSD IE 212 may be defined and incorporated into the relevant 802.11 protocol.

Figure 3:
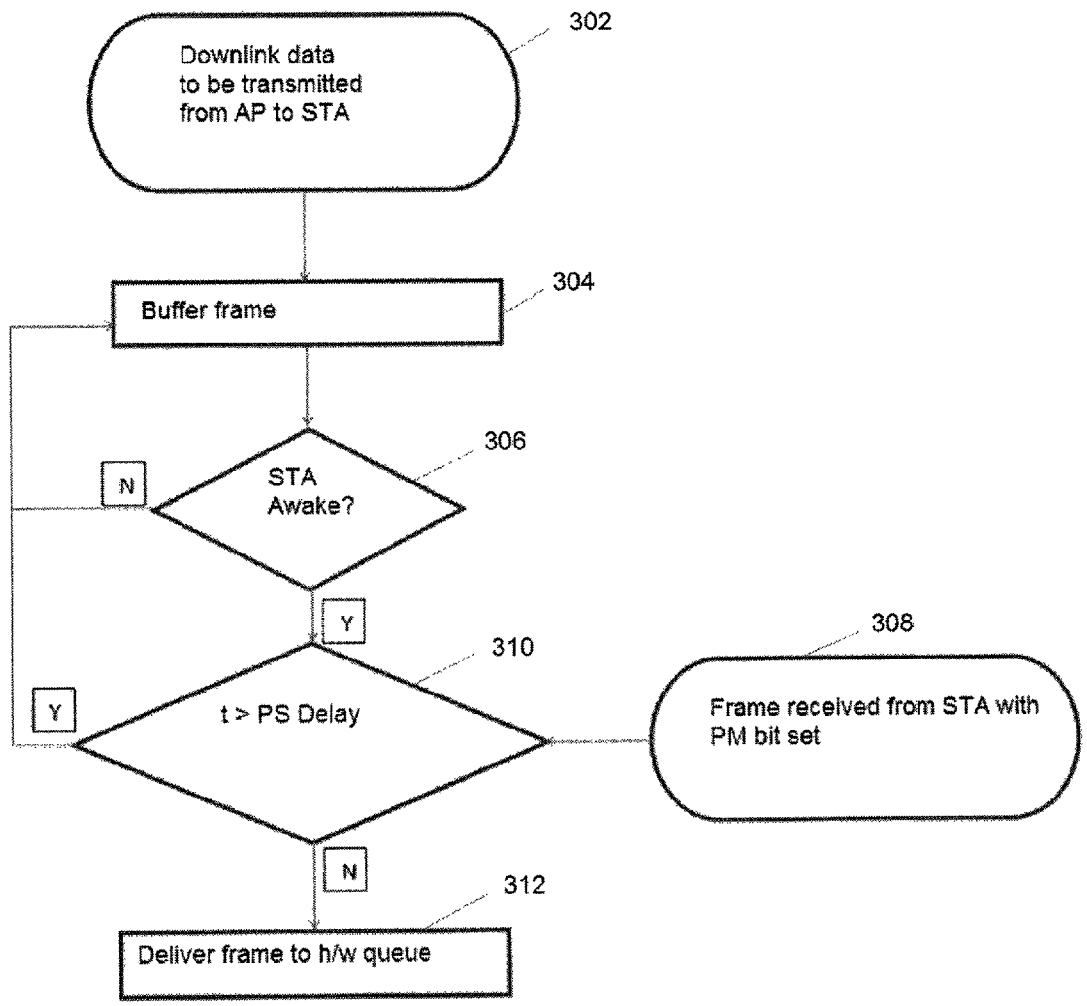
FIG. 3 depicts a flowchart showing a routine for coordinating a power save mode of operation between a STA and an AP, according to one embodiment of the invention.

An exemplary routine for coordinating power save mode operation of STA 104 with AP 102 is represented by the flowchart shown in FIG. 3. Beginning with step 302, an association process may be conducted between STA 104 and AP 102 during which various features or attributes such as security, Internet Protocol (IP) address, QoS, flows, etc. are negotiated as known to those of skill in the art. The negotiation typically entails exchanging request and response frames between STA 104 and AP 102 until the pertinent parameter values are agreed upon. Thereafter, STA 104 operates in accordance with the states or context defined by the parameters negotiated with AP 102. Accordingly, during step 302 AP 102 and STA 104 negotiate a power save delay duration (PS Delay.) In one aspect, the power save delay duration may simply be set by STA 104 according to the network configuration and desired performance. In another aspect, AP 102 may be configured to recommend a suitable power save delay duration to STA 104, which may then adopt the recommended value or adjust a predetermined value on the basis of the information received from AP 102.

Next, AP 102 may be configured to employ S/W buffer 106 to hold one or more frames addressed to STA 104 in step 304. In step 306, AP 102 determines the operational mode of STA 104 based upon a previous communication. For example, STA 104 may have already entered power save mode and informed AP 102 of the corresponding listen interval. Therefore, if AP 102 already knows STA 104 is in power save mode, and the routine returns to step 304 and holds the one or more frames in S/W buffer 106 until STA 104 exits power save mode, receives a beacon transmission from AP 102 indicating the presence of buffered frames and sends a PS-Poll message to initiate the transfer of the buffered frames. However, if the last condition associated with STA 104 is an active mode, AP 102 preferably continues to monitor for the reception of any frames from STA 104 with the power management 210 bit set.

In step 308, STA 104 sends a frame with the power management 210 bit set, indicating that it is entering power save mode. The routine continues in step 310 and AP 102 determines whether the time elapsed since the sending of the frame with the power management 210 bit set is greater than the power save delay duration. In one embodiment, this may be determined by parsing the timestamp of the power management frame. If this condition is met, the routine returns to step 304 and AP 102 continues to hold the one or more frames in S/W buffer 106 until STA 104 completes its power save cycle. If the period of time elapsed since the transmission of the frame is less than the power save delay duration, AP 102 may be configured to send the one or more frames in S/W buffer 106 to H/W queue 108 for formatting and transmission.

Therefore, STA 104 utilizes the power save delay duration to postpone entering power save mode to provide AP 102 to complete the delivery of any frames that may already be in H/W queue 108. As noted above, this minimizes or prevents frames being sent by AP 102 while STA 104 is in power save mode with the corresponding benefit that such frames will not be dropped eventually.

In addition, one of skill in the art will recognize the use of the power save delay techniques of this disclosure offers additional benefits beyond simply avoiding dropped frames. For example, a conventional AP may be configured to recognize after a given number of retried transmissions that the STA is in power save mode. At this point, the AP may treat the STA as being in power save mode and transmit a beacon with a TIM indicating there are buffered frames awaiting the STA. When the STA receives this beacon, it may initiate transfer using a PS-Poll and then return to power save mode. However, this cycle of power save to active mode and back to power save represents an undesirable latency in the transfer of information. In contrast, by using the power save delay, STA 104 remains in active mode for a sufficient period of time to receive all frames that may be in H/W queue 108 of AP 102. As a result, STA 104 operates more efficiently by avoiding the need to perform the power save mode cycling.

Accordingly, the duration assigned in PSD IE 212 may be configured to provide sufficient time for H/W queue 108 of AP 102 to clear to minimize the likelihood that a frame will be transmitted to STA 104 after it enters power save mode. Therefore, the power save delay duration may depend upon factors including the processor of AP 102, the time required to process the MAC header of the power management frame, the size of H/W queue 108, the need for AP 102 to contend for access to the wireless medium after acknowledging receipt of the power management frame, the wireless radio hardware, the protocols being employed, and the like. In one suitable example, a power save delay duration in the range of approximately 32 to 64 time slots may be employed. To the extent that the factors depend upon the current network configuration and usage, it may be preferable to determine the power save delay duration dynamically and adjust the value at the station and access point as conditions vary, for example by exchanging frames having PSD IE 212 as described above. In one aspect, the power save delay duration is defined in units of time slots to facilitate implementation.

Depending upon the implementation, AP 102 may communicate a recommended power save delay duration to STA 104 using the PSD IE 212 in an association response frame or using a separate management, control or data frame. Similarly, STA 104 may acknowledge or directly communicate a power save delay duration using the PSD IE 212 in any suitable frame and may also send a frame with the power management 210 bit set to signal the intention to enter power save mode using any suitable frame transmitted to AP 102.

Described herein are presently preferred embodiments. However, one skilled in the art that pertains to the present invention will understand that the principles of this disclosure can be extended easily with appropriate modifications to other applications.

What is claimed is:

1. A station comprising:
one or more processors; and
a memory storing instructions that, when executed by the one or more processors, cause the station to:
determine, based at least in part on information received from an access point, a period of time to delay entering a power save mode when the station has indicated that it is entering the power save mode;
transmit a power management frame to the access point to indicate that the station is entering the power save mode, wherein the power management frame includes power save delay information specifying the period of time that the station will delay entering the power save mode after transmission of the power management frame;
enter the power save mode after transmitting the power management frame and waiting the period of time specified by the power save delay information;
exit the power save mode to receive a beacon from the access point;
determine whether the access point has buffered data for the station based on the received beacon; and
when the access point has buffered data for the station, transmit a power save poll message to the access point to retrieve the buffered data.

2. The station of claim 1, wherein execution of the instructions further causes the station to receive a delivery frame from the access point after transmitting the power management frame but before entering the power save mode.

3. The station of claim 2, wherein the delivery frame is sent from a hardware queue of the access point.

4. The station of claim 1, wherein the power save delay information is configured to cause the access point to hold delivery frames intended for the station when the period of time has elapsed.

5. The station of claim 4, wherein the delivery frames are held in a software buffer of the access point.

6. The station of claim 1, wherein the period of time is determined dynamically.

7. The station of claim 1, wherein the information received from the access point includes a recommended power save delay duration, and wherein execution of the instructions further causes the station to:
determine the period of time based at least in part on the recommended power save delay duration received from the access point.

8. The station of claim 1, wherein the period of time is in the range of approximately 32 to 64 time slots.

9. A method for wireless communication between a station and an access point, the method being performed by the station and comprising:
determining, based at least in part on the information received from the access point, a period of time to delay entering a power save mode when the station has indicated that it is entering the power save mode;
transmitting a power management frame to the access point to indicate that the station is entering the power save mode, wherein the power management frame includes power save delay information specifying the period of time that the station will delay entering the power save mode after transmission of the power management frame;

entering the power save mode after transmitting the power management frame and waiting the period of time specified by the power save delay information;

exiting the power save mode to receive a beacon from the access point;

determining whether the access point has buffered data for the station based on the received beacon; and when the access point has buffered data for the station, transmitting a power save poll message to the access point to retrieve the buffered data.

10. The method of claim 9, further comprising:

receiving a delivery frame from the access point after transmitting the power management frame but before entering the power save mode.

11. The method of claim 10, wherein the delivery frame is sent from a hardware queue of the access point.

12. The method of claim 9, wherein the power save delay information is configured to cause the access point to hold delivery frames intended for the station when the period of time has elapsed.

13. The method of claim 12, wherein the delivery frames are held in a software buffer of the access point.

14. The method of claim 9, wherein the period of time is determined dynamically.

15. The method of claim 9, wherein the first information includes a recommended power save delay duration, and wherein the method further comprises:

determining the period of time based at least in part on the recommended power save delay duration received from the access point.

16. The method of claim 9, wherein the period of time is in the range of approximately 32 to 64 time slots.

* * * * *